Dec. 27, 1927.
E. W. ARNOLD
1,654,204
WELTING
Filed June 17, 1927
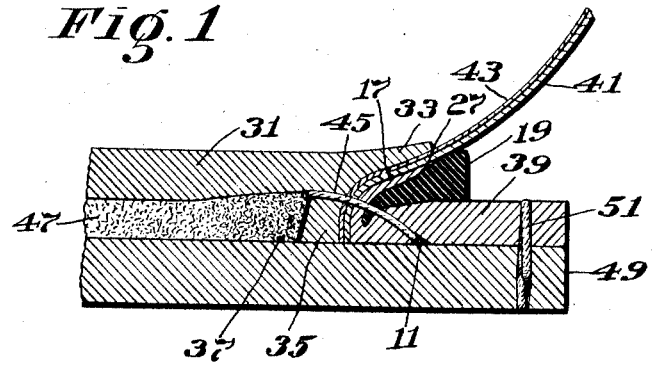
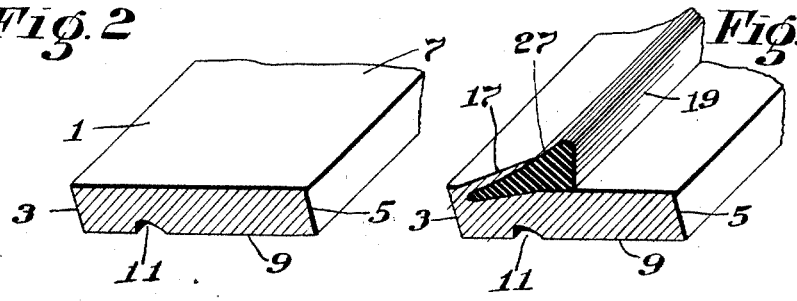
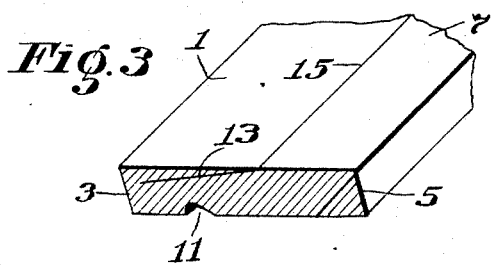
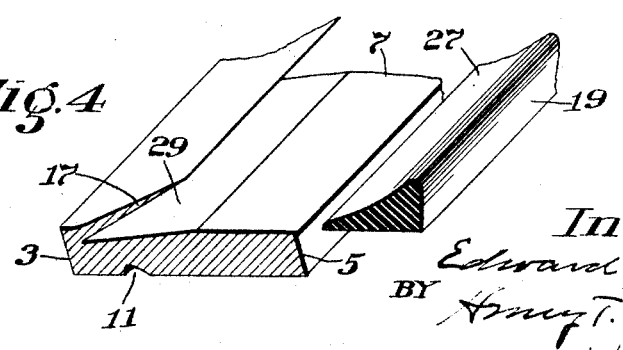
Inventor:
Edward W. Arnold
BY Henry T. Williams
Attorney.

Patented Dec. 27, 1927.

1,654,204

UNITED STATES PATENT OFFICE.

EDWARD W. ARNOLD, OF NORTH ABINGTON, MASSACHUSETTS.

WELTING.

Application filed June 17, 1927. Serial No. 199,593.

The invention to be hereinafter described relates to welting for use in the manufacture of shoes.

The aim and purpose of the invention is to provide welting having a bead or filler which projects up from the body of the welting and is adapted to be located closely against the upper where the latter meets the insole. This bead or filler preferably is made of rubber or other waterproof material, and is so disposed with respect to the body of the welting that the inseam stitching will pass through the rubber or other waterproof material and prevent ingress of moisture into the shoe along the stitching.

Heretofore, welting has been made with a waterproof filler, but so far as I am aware, such welting has not been made so simply and cheaply as the welting of my present invention, and has not been made with the advantages inherent thereto.

The character of the invention may be best understood by reference to the following description of one good form thereof shown in the accompanying drawing, wherein:

Fig. 1 on an enlarged scale is a transverse section through a portion of the shoe equipped with a welt embodying the invention;

Figs. 2, 3 and 4 are perspective sectional views showing stages in the manufacture of the welting;

Fig. 5 on an enlarged scale is a perspective view of the welting; and

Fig. 6 is a perspective sectional view of the welting of the size manufactured.

Referring to the drawing, 1 (Fig. 2) designates a strip of leather formed by slitting the same from stock, and preferably with its inner edge 3 and outer edge 5 oblique to the grain face 7 and flesh face 9 of the stock. A stitching receiving channel 11 is formed in the flesh face of the strip adjacent the inner edge thereof.

Next a slit 13 (Fig. 3) is incised in the strip cutting through the grain face thereof along the line 15 which is intermediate the inner and outer edges of the strip. This slit in the present instance is inclined from said line a substantial distance toward the inner edge of the strip, thereby forming a feather or lip 17 (Fig. 4) which is integral with the body of the strip and which is tapered from its line of juncture with the body toward the free edge thereof, although it is not essential that it shall be tapered.

The bead or filler 19 of rubber or other suitable material is substantially wedge-shaped in transverse section, and has a flange 21 which is inserted into the wedge-shaped groove 29 between the feather and the body of the strip and formed by flexing the feather up therefrom. When the flange is inserted in the groove, the feather 17 will overlie said flange (Fig. 5) and may extend along the same toward the thickest portion of the bead while leaving said portion exposed beyond the edge of the feather. The flange of the bead may be cemented, stitched or otherwise secured in the groove between the feather and the body of the strip. The stitching receiving channel 11 referred to, is suitably located to receive the stitching, and is opposite the flange of the bead and the feather, so that the inseam stitching will be sure to pass through the flange of the bead, and when the latter is of rubber or other waterproof material, will have the desirable advantage of contributing to the waterproof character of the shoe.

The welting described is simple and cheap in construction, and easy to manufacture in proper form. This is an important consideration, since imperfect welting means a substantial loss to welting and shoe manufacturers.

Having described the welting, next will be described the application of the welt to a shoe. Referring to Fig. 1, 31 designates an inner sole having a feather 33, a lip 35 and a stitch receiving rib 37. A welt 39 embodying the invention has its inner edge fitted snugly into the angle between the feather and lip of the inner sole, the marginal portions of the upper 41 and its lining 43 being interposed between the adjacent edges of the inner sole and the welt. These parts are secured together by the inseam stitching 45. After beating out the welt in the usual manner, the filler 47 is applied to the inner sole within the boundary of the welt and the stitching receiving rib, and the welt and the outer sole 49 are secured together by the outseam stitching 51.

There are important advantages in the welting embodying the invention. The provision of the feather formed as described of substantial width overlying the flange of the bead, presents a grain surface against the upper and in the angle between the feather and lip of the inner sole. The exposed portion of the bead beyond the edge of the feather, desirably sets into the angle between the upper and the body of the welt, assists in supporting the upper and in holding its shape, and adds to the appearance of the shoe. Also, the bead contributes to the strength of the welt, has the waterproof character, referred to, and increases rather than reduces the flexibility of the welt, so that it may be readily bent around the toe of the shoe.

There is no danger when applying the outseam stitching that the needle will reach and cut through the inseam stitching since the bead prevents such occurrence.

It will be understood that the invention is not limited to the specific embodiment shown, and that various deviations may be made therefrom without departing from the spirit and scope of the appended claims.

What is claimed is:

1. As an article of manufacture, welting for use in making welt shoes, comprising a leather strip having flesh and grain faces, a slit incised through the grain face along a line intermediate the inner and outer edges of the strip, said slit being of substantial depth and inclined downward from said line toward the inner edge of the strip, thereby forming a feather, and a filler extending longitudinally of the strip and having a substantial portion of its width between the feather and the body of the strip and secured thereto.

2. As an article of manufacture, welting for use in making welt shoes, comprising a leather strip having flesh and grain faces, a slit incised through the grain face and extending obliquely thereto toward the inner edge of the strip thereby forming a longitudinal feather at the grain face, and a member having a flange in the slit beneath the feather and a bead exposed beyond the edge of the feather.

3. As an article of manufacture, welting for use in making welt shoes, comprising a leather strip having flesh and grain faces, a slit incised through the grain face along a line intermediate the inner and outer edges of the strip and extending obliquely thereto toward the inner edge of the strip, thereby forming a longitudinal feather at the grain face, and a rubber bead having a flange in the slit secured to the strip.

4. As an article of manufacture, welting for use in making welt shoes, comprising a strip having a slit incised through one of the faces thereof along a line intermediate the inner and outer edges of the strip, said slit extending from said line toward the inner edge and forming a feather, and a member having a portion thereof between the feather and the body of the strip, and a stitching receiving channel in the face of the strip opposite to the feather and member.

5. As an article of manufacture, welting for use in making welt shoes, comprising a leather strip having flesh and grain faces, a slit incised through the grain face and extending toward the inner edge of the strip and forming a feather, a bead of waterproof material having a portion between the feather and the body of the strip, and a stitching receiving groove in the flesh face of the strip opposite to said waterproof member, that the inseam stitching may pass through said member.

6. As an article of manufacture, welting for use in making welt shoes, comprising a leather strip having flesh and grain faces, a feather at the grain face of the strip, integral therewith and tapered toward the free edge thereof, and a filler, substantially wedge shaped in transverse section between the feather and the body of the strip, said filler having a portion beyond and not covered by the feather.

7. As an article of manufacture, welting for use in making welt shoes, comprising a leather strip having flesh and grain faces, a slit incised through the grain face along a line intermediate the inner and outer edges of the strip, said slit extending toward the inner edge of the strip, thereby forming a lip extending toward, but not to the outer edge of the strip, a filler extending longitudinally of the strip, said lip overlying the filler and a stitching receiving channel in the flesh face of the strip and opposite to the lip.

EDWARD W. ARNOLD.